US007965620B2

(12) United States Patent
Gadgil et al.

(10) Patent No.: US 7,965,620 B2
(45) Date of Patent: Jun. 21, 2011

(54) METHOD, COMPUTER PRODUCT AND SYSTEM FOR CORRELATING EVENTS IN A NETWORK

(75) Inventors: Shrirang Gadgil, Eatontown, NJ (US); Narayanan Natarajan, Marlboro, NJ (US)

(73) Assignee: Telcordia Licensing Company, LLC, Piscataway, NJ (US)

( * ) Notice: Subject to any disclaimer, the term of this patent is extended or adjusted under 35 U.S.C. 154(b) by 1065 days.

(21) Appl. No.: 10/853,083

(22) Filed: May 25, 2004

(65) Prior Publication Data
US 2005/0276217 A1 Dec. 15, 2005

(51) Int. Cl.
*G01R 31/08* (2006.01)
(52) U.S. Cl. ........ 370/216; 370/242; 370/248; 370/335; 370/356; 370/409; 370/389; 370/406; 370/392; 709/242; 709/221; 709/226
(58) Field of Classification Search .................. 370/216, 370/242, 248, 335, 356, 409, 389, 406, 392; 709/239, 242, 221, 226
See application file for complete search history.

(56) References Cited

U.S. PATENT DOCUMENTS

| | | | |
|---|---|---|---|
| 6,006,016 A * | 12/1999 | Faigon et al. | 714/48 |
| 6,359,857 B1 * | 3/2002 | Ahmad et al. | 370/217 |
| 6,604,208 B1 | 8/2003 | Gosselin et al. | 714/4 |
| 6,633,544 B1 | 10/2003 | Rexford et al. | |
| 6,665,273 B1 | 12/2003 | Goguen et al. | 370/252 |
| 6,671,818 B1 | 12/2003 | Mikurak | 714/4 |
| 6,778,492 B2 * | 8/2004 | Charny et al. | 370/228 |
| 6,862,698 B1 * | 3/2005 | Shyu | 714/57 |
| 6,901,530 B2 * | 5/2005 | Cerami et al. | 714/4 |
| 6,985,901 B1 * | 1/2006 | Sachse et al. | 707/10 |
| 6,987,727 B2 * | 1/2006 | Fredette et al. | 370/225 |
| 7,012,919 B1 * | 3/2006 | So et al. | 370/392 |
| 7,124,187 B1 * | 10/2006 | Kodialam et al. | 709/226 |
| 7,142,518 B2 * | 11/2006 | Mitchell | 370/290 |
| 7,164,652 B2 * | 1/2007 | Puppa et al. | 370/225 |
| 7,299,278 B2 * | 11/2007 | Ch'ng | 709/224 |
| 2002/0023089 A1 | 2/2002 | Woo | |
| 2002/0167898 A1 | 11/2002 | Thang et al. | |
| 2003/0063613 A1 * | 4/2003 | Carpini et al. | 370/401 |
| 2004/0004937 A1 * | 1/2004 | Skalecki et al. | 370/227 |
| 2005/0013242 A1 * | 1/2005 | Chen et al. | 370/228 |
| 2005/0068953 A1 * | 3/2005 | Benjamin | 370/389 |
| 2005/0099419 A1 * | 5/2005 | Castonguay et al. | 345/420 |
| 2005/0232157 A1 * | 10/2005 | Tyan et al. | 370/237 |
| 2006/0056328 A1 * | 3/2006 | Lehane et al. | 370/315 |

OTHER PUBLICATIONS

G. Liu, Composite Events for Network Event Correlation, IEEE, May 28, 1999.*

(Continued)

*Primary Examiner* — Huy D Vu
*Assistant Examiner* — Kibrom T Hailu

(57) ABSTRACT

In one aspect a method for correlating network events in a network comprises correlating the events relating to paths with events relating to links traversed by paths. In another aspect, the method includes correlating the events based on whether paths traversing the network share network resources, such as links. Preferably, the method is implemented in a network where paths traversing the network change dynamically in response to other network events and based on traffic engineering priorities.

31 Claims, 13 Drawing Sheets

OTHER PUBLICATIONS

G. Liu (Composite Events for Network Event Correlation, IEEE, May 28, 1999).*

"A Comparison of Multiprotocol Label Switching (MPLS) Traffic-Engineering Initiatives," The International Engineering Consortium, Web ProForum Tutorials, pp. 1-20, http://www.iec.org/online/tutorials/mpls_traffic/index.html.

"Multiprotocol Label Switching (MPLS)," The International Engineering Consortium, Web ProForum Tutorials, pp. 1-24, http://www.iec.org/online/tutorials/mpls/index.html.

International Search Report from PCT/US2005/017955 mailed on Jul. 12, 2006.

* cited by examiner

FIG. 2

| Event | Cause Link-Down | Link-Up | LSP-Down | LSP-Up | LSP- Reroute |
|---|---|---|---|---|---|
| LSP-Down | P1 | | | S3 | S5 |
| LSP-Up | | P2 | S1 | | S6 |
| LSP-Reroute | P3 | P4 | S2 | S4 | S7 |

FIG. 3

|   | Field | Description |
|---|---|---|
| 1 | LinkId* | Subnet address for the link |
| 2 | IpAddressA* | IP address of A end |
| 3 | IpAddressZ* | IP address of Z end |
| 4 | LinkStatus | Operational status of the link; (0=failed; 1=operational) |

FIG. 4

|   | Field | Description |
|---|---|---|
| 1 | LspId* | Unique name for LSP; typically "router/tunnelId" |
| 2 | Priority* | Integer 0..7 (0 is the highest) |
| 3 | LSPStatus | Operational status of the LSP; (0=failed; 1=operational) |
| 4 | CurrentRoute | Integer (0 = primary; 1 = backup) |

FIG. 5

|   | Field | Description |
|---|---|---|
| 1 | LspId* | Unique name for LSP; typically "router/tunnelId" |
| 2 | RouteOrder* | Integer (0 = primary; 1 = backup) |
| 3 | Hop* | Integer (hop number) |
| 4 | IpAddress* | IP address of the ingress interface of the hop |

METHOD, COMPUTER PRODUCT AND SYSTEM FOR CORRELATING EVENTS IN A NETWORK

BACKGROUND OF THE INVENTION

Root cause analysis in communication networks typically involves determining the actual fault or problem that causes a network outage, alarm or event. A single fault in a network usually generates a plurality of event or alarm messages relating to a plurality of links connecting network devices and to the devices themselves. A network monitoring device typically receives a plurality of messages and tries to determine from the messages the location of one or more faults in the network. In addition, an effort is made to associate the messages received with faults that are identified. In this way, an engineering decision can be made prioritizing faults based on the severity of a fault, e.g., the type and number of messages associated with a particular fault typically indicates its severity.

Known root cause analysis methods typically determine the ultimate cause or fault in a network based on a known network topology. For example, a map of the network that includes all the nodes in the networks and the links between the nodes is typically maintained. When messages are received by a network monitoring device, the device then performs a root cause analysis based on the network topology and the messages receive. U.S. Pat. No. 6,604,208 to Gosselin, et al., ("the '208 patent") is exemplary of such schemes. In the '208 patent the hierarchical nature of a network is used to correlate alarm events. Over time alarms are processed in view of an historical context to determine instances of correlation such that alarms are partitioned into correlation sets where the alarms within one set have a high probability of being caused by the same network fault. Schemes such as that employed in the '208 patent, however, loose much of their utility in a network where hierarchical relationships within the network do not remain constant.

More particularly, in networks where hierarchical relationships do not exist between network devices or where the hierarchical relationships in the network change dynamically in response to faults or other events the meaning of alarm or event messages that are generated also change dynamically.

A network employing multi-protocol label switching (MPLS) is exemplary of networks where network topology or hierarchy alone cannot be relied on to perform root cause analysis. In an MPLS network data transmission occurs on label-switched paths (LSPs). LSPs are defined by a sequence of labels that are distributed at each node along a path from a source to a destination. LSPs may be established either prior to data transmission (control driven) or upon detection of a certain flow of data (data-driven). The labels, which are underlying protocol-specific identifiers, may be distributed using label distribution protocol (LDP) or RSVP or piggybacked on routing protocols such as border gateway protocol (BGP) and OSPF. The labels are of fixed-length and are inserted at very beginning of a packet or cell. The labels may be then used by nodes in the network to switch the packets or cells between links coupled to the switching node.

An LSP may be established using either hop-by-hop or explicit routing. Hop-by-hop routing is similar to that used in IP (Internet Protocol) networks. In particular, in hop-by-hop routing, each label switched router (LSR) independently selects the hop for each label switched packet. In explicit routing, an ingress LSR (i.e., an LSR where data flow originates) specifies the list of nodes through which data will flow. Explicit routing may also be strict or loose. A strict explicitly routed label switched path follows a list of nodes using the actual addresses of each node that is to be traversed, while a loose explicitly routed label switched path is more adaptive and allows groups of nodes, specified as an autonomous system number, to act as one of the nodes that may be traversed.

In an MPLS network the path that data takes through the network changes dynamically in response to failures or repairs. For example, a failure on a first LSP may preempt service on a second LSP path because the first LSP was granted a higher priority than the second LSP. A device monitoring the network may receive a plurality of event status messages from the different nodes that are affected by the failure. The event status messages are in the form of traps and include information identifying the LSP and the status of the LSP. The traps, however, do not generally include information that would indicate any relationship between the different event messages or traps.

Of utility then are methods and systems for correlating events or event messages in MPLS-type networks and for determining a root cause of the events or event messages.

SUMMARY OF THE INVENTION

In one aspect, the present invention is a method for correlating events in a network. The method preferably includes receiving a plurality of network events from the network, the network events each being associated with a service path through the network and correlating a first network event and a second network event among the plurality of network events based a relationship between a first service path associated with the first network event and a second service path associated with the second network event.

Further in accordance with the method, the step of correlating may desirably include determining whether the second network event was caused by activity on the first service path.

In addition, the step of correlating may include determining whether the first service path shares a link with the second service path. It may be further preferable if the step of correlating includes determining whether the first service path shares a link with the second service path.

Further in accordance with this aspect of the present invention, the network preferably comprises a multiprotocol label switching network.

Additional aspects of the method also desirably include receiving a message indicating that a label switched path comprising at least one service path in a multiprotocol label switching network failed. The method may also preferably be applied where the multiprotocol label switching network is an internet protocol network or a generalized multiprotocol label switching optical network.

In addition, the step of receiving preferably comprises receiving a message indicating that a label switched path in a multiprotocol label switching network was restored to service. Further still, the step of receiving may also comprise receiving a message indicating that a label switched path in a multiprotocol label switching network was rerouted or restored to service.

An additional aspect of the present invention is a method for correlating network events, comprising receiving a plurality of network events from the network, tracking information relating to the current route of service paths through the network and correlating the plurality of network events based on the dynamic routing information. Further in accordance with this aspect of the present invention, the correlated events are preferably represented in the form of a directed acyclic graph.

In accordance with this additional aspect of the present invention, the step of representing the correlated events in the form of a directed acyclic graphs includes indicating whether a recorded event is caused by another recorded event from among the plurality of events. Further still, the tracked route information preferably includes an association between a label switched path traversing the network and a link in the path.

In another aspect, the present invention includes a system for correlating events in a network. The system comprises a processor, data and instructions executable by the processor. The instructions preferable include the steps of associating routes traversing the network with links between devices in the network, receiving a plurality of network events from the network, correlating a first network event and a second network event among the plurality network events based on the association between the routes traversing the network and the links between devices in the network and representing the associated events in the form of a directed acyclic graph.

Further in accordance with the system, the network is preferably a multiprotocol label switching network. In addition, the route information preferably includes one or more label switched paths in a multiprotocol label switching network. In accordance with the system aspect the network events are preferably in the form of Simple Network Management Protocol traps.

BRIEF DESCRIPTION OF THE DRAWINGS

FIG. 2 illustratively depicts a matrix for correlating events in a network in accordance with another aspect of the present invention.

FIG. 3 illustratively depicts a data structure used in accordance with an aspect of the present invention.

FIG. 4 illustratively depicts a data structure used in accordance with an aspect of the present invention.

FIG. 5 illustratively depicts a data structure used in accordance with an aspect of the present invention.

DETAILED DESCRIPTION

Figure 1:
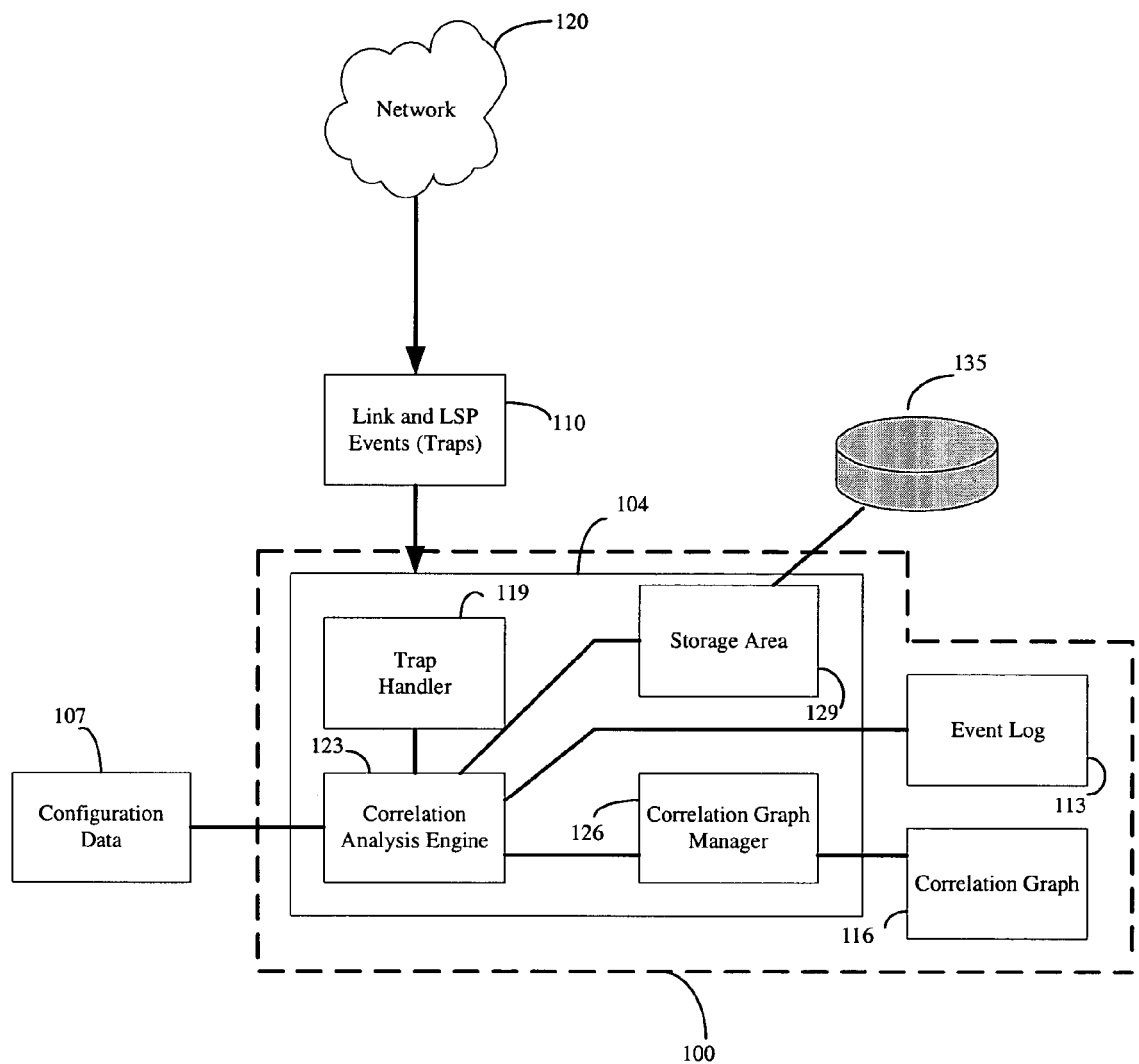
FIG. 1 illustratively depicts a system in accordance with an aspect of the present invention.

FIG. 1 depicts a block diagram of a system 100 in accordance with an aspect of the present invention. The system includes a correlation engine 104, which receives as inputs configuration data 107 and MPLS link and LSP (label switched paths) events 110. Outputs of the system 100 preferably include an event log 113 and a correlation graph 116. In a preferred embodiment, the correlation engine includes a trap handler 119, a correlation analysis engine 123 and a correlation graph manager 126 as functional components. The system further preferably includes a storage area 129 for storing data and data structures used by the correlation engine 104 during processing or correlation analysis including network configuration data 107 and status information. Preferably, the storage area 129 includes a ROM (Read Only Memory) for storing the data and data structures used by the correlation analysis engine. Alternatively, the storage area 129 may be implemented as a database 135 separate from the system 100. The functional components of the system 100 are preferably implemented as a Java program with a separate thread for each of the functional components, i.e., the trap handler 119, the correlation analysis engine 123 and the correlation graph manager 126.

The system 100 may comprise a computer operating in accordance with the DOS, Linux or MAC operating system that includes a memory (not shown) for storing and executing instructions comprising the process or method aspects of the present invention represented by the functional components. In general, a system in accordance with this aspect of the present invention may be implemented on any operating system capable of supporting JAVA, C or C++ programs that perform the methods discussed below. Alternatively, the process or method may comprise a module in an object oriented program that outputs a correlation graph or provides the data underlying a correlation graph to another object module. This system may also form a module in a Operation Support System.

The trap handler 119 receives traps 110 from the network 120. The correlation analysis engine 126 consists of a thread that is initially dormant and is notified by the trap handler 119 of a network event. The correlation graph manager 126 maintains the correlation graph 116. The correlation graph 116 may be represented as a table with each row in the table representing a node in the correlation graph. Each row would contain the following fields: <EVENTID, EVENT TYPE, LINKID/LSP ID, timestamp, list of IDs of correlated events>. The correlation graph manager 126 adds a row to the table when it receives correlation results from the correlation analysis engine 123.

Preferably, the link and LSP events 110 are in the form of traps that are defined in the Internet Engineering Task Force (IETF) MPLS-TE-MIB, the disclosure of which is incorporated by reference herein in its entirety. Traps 110 are preferably autonomously generated by a network 120, such as an MPLS network, and comprise a message from an agent in the network, e.g., router, host, client, workstation, etc., indicating a condition that requires immediate attention. A trap is also known as an alarm or an alert. Traps 110 may also be in the form of a Simple Network Management Protocol (SNMP) trap and indicate a network event based upon network failures such as for example, a router failure, a router interface failure or link failures. Traps 110 may also be generated when resources (e.g., a router or router interface) are re-introduced in the network after repair.

Traps 110 instantiate or start the correlation engine 104. In a preferred embodiment, traps 110 are generated by an MPLS network and include the following messages: LINK DOWN—sent by a network device, e.g., router, when an interface on the network device fails; LINK UP—sent by a network device when a previously failed interface becomes operational; LSP DOWN—sent by a network device when an LSP originating from a network device fails; LSP UP—sent by network device when a previously failed LSP becomes operational or when the route of an LSP changes; and LSP REROUTED—sent by a network device when the network device reroutes an LSP originating from the network device. Upon receipt of any of these traps from a network the correlation engine 104 is invoked and performs a correlation analysis to determine whether an event is caused by or related to another event.

Configuration data 107 preferably includes network configuration data for an MPLS network. More particularly, for each link that connects two devices in a MPLS network, a LINK ID is specified using the IP address of the subnetwork associated with the link along with the IP address of the two interfaces connected by the link. For each LSP configured in the MPLS network, the following information is supplied: a LSP ID; a primary route specified using a list of LINK IDs; and a list of backup routes. The backup routes are preferably ordered to correspond to the routing priority order in the case of a failure. Furthermore, each route traversing the network is preferably configured as a strict explicitly routed label switched path, i.e., all links traversed by the LSP are included in the route description. Configuration data 107 is preferably supplied only once as initialization data and represents the actual network configuration. In addition, label switch path reoptimization is preferably enabled in the MPLS network such that label switched paths that are traversing a backup route will revert to their primary route once the primary route becomes available.

Event log 113 and correlation graph 116 represent the results of the correlation analysis. Event log 113 is preferably a database that maintains the event messages or traps 110 received from the network 120 and the results of the correlation analysis. For example, the information in event log 113 preferably includes the following information: EVENT TYPE (LINK UP, LINK DOWN, LSP UP, LSP DOWN, LSP REROUTE); EVENT CLASSIFICATION (ROOT CAUSE, SECONDARY CAUSE); CORRELATION RESULT (RELATIONSHIP BETWEEN SECONDARY EVENTS and ROOT CAUSE).

Correlation graph 116 represents the cumulative results of the correlation analysis and is preferably presented in the form of a directed acyclic graph. The correlation graph 116 represents the deviation of the current state of the network from a reference network state. In accordance with an aspect of the present invention, a node in the correlation graph represents an event 110 that is received from the network 120. A directed edge for a node, e.g., Node A, to another node, e.g., Node B, denotes a causal dependency between the nodes, i.e., event A is caused by event B. The casual dependency or relationship between one or more nodes is calculated by the correlation engine 104. Each node may include multiple outgoing edges as well as multiple incoming edges, with each edge denoting a distinct dependency. Further in accordance with this aspect of the present invention, the following five types of nodes may be included in a correlation graph: LINK UP or LKU; LINK DOWN or LKD; LSP UP or LPU; LSP DOWN or LPD; or LSP REROUTED or LPR. LKU and LKD events are regarded as root cause events and therefore LKU and LKD nodes do not include outgoing edges. The correlation engine 104 adds or removes nodes and edges from a correlation graph in response to one or more events that are received from the network. In addition, the network is considered to be in the reference state if every LSP is operational and routed on its primary path. When the network is in the reference state, the correlation graph 116 is empty.

In an MPLS network, when failures or repairs occur, the status of some LSP (label switched paths) may be affected. Three types of LSP status changes are possible: operational state changes from FAILED to UP, operational state changes from UP to FAILED, or changes in LSP routes. In accordance with the present invention, such LSP status changes are referred to as LSP Impacts. Further in accordance with an aspect of the present invention, an LSP impact is considered a primary impact if the impact is a direct consequence of a network resource (network device, link, or interface) state change caused by a resource failure or resource repair. In the case of a resource failure, a primary impacted LSP is an LSP that was traversing the resource at the time of failure. The status of such an LSP will change as a result of the failure either because it is re-routed by the MPLS network or it is not re-routed and its status changes to FAILED. In the case of a resource repair, an LSP may experience a primary impact if the LSP was in a DOWN state before the repair and it becomes operational due to the repair. In addition, an LSP may experience a primary impact if the LSP was in an UP state before the repair and after the repair, the network reroutes the LSP on a route that traverses the repaired resource. This latter situation may arise if revertive restoration or LSP re-optimization is supported by the network.

An LSP impact is considered a secondary impact if the impact is an indirect consequence of a network status change. More precisely, an impact is called a secondary impact if it is a consequence of the status change of another LSP. Secondary impacts arise due to the multilevel LSP priority and preemption feature that is supported by MPLS networks. When an LSP is configured, a priority level called the holding priority is associated with the LSP. When the MPLS network reroutes a higher priority LSP after a resource failure, it may preempt a lower priority LSP to accommodate the higher priority LSP. The MPLS network may reroute a preempted LSP after preempting another LSP with further lower priority. Thus, preemption effects may be cascaded until no further rerouting of LSPs is possible. All such preempted LSPs are called secondary impacted LSPs. Secondary impacts may also arise due to a resource repair.

In accordance with an aspect of the present invention, as a result of the correlation analysis, LSP impacts are classified as being either primary or secondary impacts, primary LSP impacts are correlated with network status changes and secondary LSP impacts are correlated with primary LSP impacts. As previously discussed, the classification is preferably represented in the form of a directed acyclic graph. In accordance with this aspect of the present invention, configuration data 107 is initially provided to the system 100 and stored in storage area 129 or database 135. Upon receipt of either a Link or LSP event 110, the trap handler 119 submits the event to correlation analysis engine 123. The engine 123 then retrieves data from the storage area 129 or database 135 relating to previous events and correlate the received event with the previous events. The correlation is then provided to the correlation graph manager 126 and the event log 113. The correlation graph manager 126 thereafter updates the correlation graph 116 to reflect the current network state.

In accordance with an aspect of the present invention, different types of primary and secondary LSP impacts that may occur in an MPLS network are identified in a correlation matrix 200 as shown in FIG. 2. Primary impacts in FIG. 2 are denoted with a P whereas secondary impacts are denoted with an S. In correlation matrix 200, a non-null entry in the cell (i,j) denotes that the LSP event corresponding to the ith row is impacted by (caused by) the event corresponding to the jth column. Specifically, P1 denotes that an LSP is down because a link in its path is down. P2 denotes that an LSP is up because a link in its path has been cleared. P3 denotes that an LSP is rerouted to a backup path because a link in its path is down. P4 denotes that an LSP is rerouted to its preferred path because a link on its preferred path is up. S1 denotes that an LSP is up because a higher priority LSP is down and has released enough bandwidth for this LSP. S2 denotes that an LSP is rerouted to its preferred path because a higher priority LSP that was preempting it on its preferred path is now down. S3 denotes that an LSP is down because a higher priority LSP is now up and has preempted it. S4 denotes that an LSP is rerouted to a backup path because a higher priority LSP is now up and has preempted it on its preferred path. S5 denotes that an LSP is down because a higher priority LSP is rerouted and this preempts it on its current path. S6 denotes that an LSP is up because a higher priority LSP is rerouted and it has released bandwidth for this LSP. S7 denotes that an LSP is rerouted to a backup path because a higher priority LSP is rerouted and this preempts it on its current path.

FIGS. 3, 4 and 5 illustrate data structures used by the correlation engine 104. Each of these data structures may be stored in memory 129 or database 135.

FIG. 3 illustrates a data structure 300 that includes the information associated with links in the network 120 that is used for correlation analysis. As FIG. 3 shows, the link identification information includes a LINKID parameter such as sub-network IP address associated with the link, an IPADDRESSA parameter, which is the IP address at the A-end origination point of the link, and an IPADDRESSZ parameter, which is the IP address at the Z-end of termination point of the link. In addition, link identification information includes a LINKSTATUS parameter indicating the operational status of the link. In accordance with a preferred embodiment the LINKSTATUS parameter may be set to 0 if the link is in a FAILED state or to 1 if the link is operational or UP. Furthermore, the LINKSTATUS is updated whenever a link trap is received from the network 120. The LINKID, IPADDRESSA and IPADDRESSZ parameters are preferably loaded into memory 129 or database 135 during initialization of the system 100 based on the configuration data 107.

FIG. 4 illustrates a data structure 400 that includes information associated with LSPs or routes in the network 120 that are used for correlation analysis. The data structure includes a unique identifier, LSPID, for the LSP, a parameter, PRIORITY, associated with the priority level of a LSP relative to other LSPs and a status parameter, LSPSTATUS, associated with the operational status of an LSP. LSPSTATUS is updated whenever a LSP trap is received from the network 120 indicating an operational status change. The parameters LSPID and PRIORITY are preferably loaded into memory 129 or database 135 during initialization of the system 100 based on the configuration data 107.

FIG. 5 illustrates a data structure 500 for tracking configured and actual routes for LSPs traversing the network. As FIG. 5 shows, in addition to the LSPID, the data structure 500 includes a ROUTETYPE parameter and a HOP parameter. The data structure 500 also includes the IP address of the ingress interface, IIPADDRESS, of each hop that makes up an LSP. Route information is updated upon receipt of an LSPUP or LSPREROUTE trap. All the parameters that form the data structure 500 are preferably loaded into memory 129 or database 135 during initialization of the system 100 based on the configuration data 107.

In addition to the data structures shown in FIGS. 3, 4 and 5, the system generates and uses the following three temporary data structures: PRIMARYLSPLIST, LINKUPHISTORY and LSPEVENTSHISTORY.

The PRIMARYLSPLIST is of the form <EVENTID, EVENTTYPE, LINKID, LSPID>. The PRIMARYLSPLIST is empty to begin with. This list is appended with new entries whenever a link event (failure or repair event) is received. On receipt of a link event, the correlation engine prepares a list of LSPs that are traversing the reported link based on the current route information stored in the database. These LSPs comprise the label switched paths that will be affected and are referred to as primary impacted LSPs. A unique EVENTID is generated for each link event. An entry is created in the PRIMARYLSPLIST for each primary impacted LSP. For each link event, a unique EVENTID is generated and the attributes EVENTID, LINKID, and LSPID are initialized with appropriate values. The EVENTTYPE attribute is typically set later when an LSP event is received. After processing of the LSP event, all the entries for that LSP are removed from the list.

The LINKUPHISTORY list contains entries of the form <EVENTID, LINKID, TIMESTAMP>. The LINKUPHISTORY list is empty to begin with. When the correlation engine receives a link clearance event, an entry for that link is appended to this list. An entry remains in the list for a preset time interval after which it is removed from the list. Thus this list represents a recent history of link clearances.

The LSPEVENTSHISTORY contains entries of the form <EVENTTYPE, LSPID, TIMESTAMP, OLDROUTE, NEWROUTE>. This list is empty to begin with. When the correlation engine receives a link clearance event, an entry for that link is appended to this list. An entry remains in the list for a preset time interval after which it is removed from the list. Thus, the LSPEVENTSHISTORY list represents a recent history of link clearances.

Figure 6:
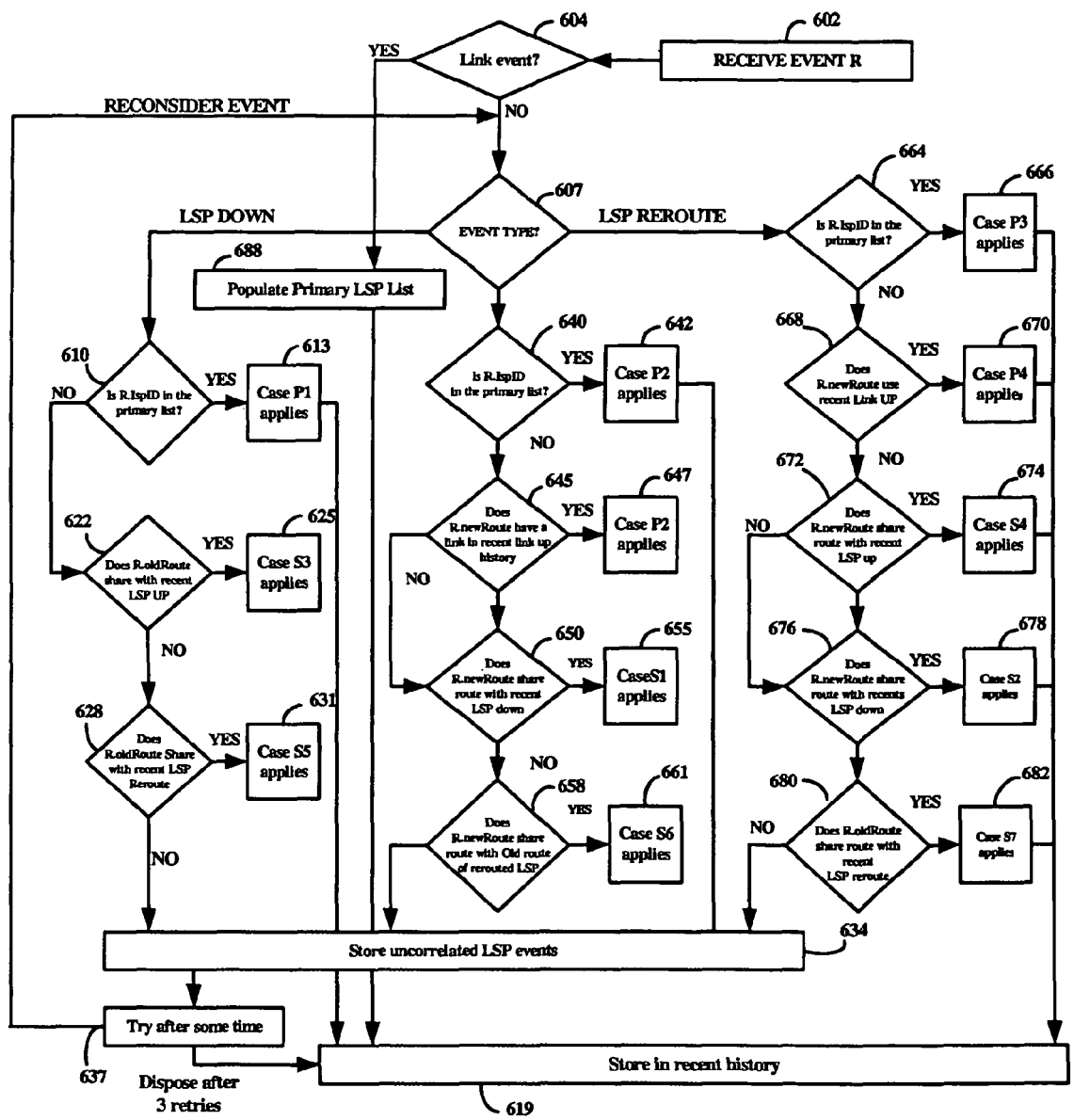
FIG. 6 is a flow chart of a method in accordance with an aspect of the present invention.

Turning now to FIG. 6, there is shown a flow chart illustrating a method 600 for correlating events in accordance with an aspect of the present invention. The method 600 determines whether an event, denoted as R, is a primary LSP impact event or a secondary LSP impact event. As previously discussed, secondary LSP impact events are the result of the MPLS network enforcing priorities to reroute or preempt impacted LSPs. A record denoted as REVENT is associated with the event R. The record REVENT includes the following fields <REVENTID, REVENTTYPE, RLSPID, ROLDROUTE, RNEWROUTE>.

The method begins with the receipt of the event R, block 602. A determination is made at diamond 604 whether the event R is a link event. If the event R is not a link event, then a determination is made at diamond 607 as to the type of event by examining the REVENTTYPE field. If REVENTTYPE is set to LSP DOWN, then the process continues to diamond 610. At diamond 610, RLSPID is checked against the PRIMARYLSPLIST to determine whether RLSPID matches an LSPID entry in the PRIMARYLSPLIST associated with a LINK DOWN event. If RLSPID matches an LSPID in the PRIMARYLSPLIST and the LSPID also includes an entry indicating that a link in the path associated with LSPID experienced a link down condition (i.e., LINK DOWN), then the event R is correlated with the event associated with the LINK DOWN condition. Under these conditions, case P1 in FIG. 2 applies as is indicated in block 613. In other words, because the PRIMARYLSPLIST associates and stores link events along with the label switch paths traversing the link (based on the route information currently stored) that generated the link event, RLSPID may then be correlated with each link event that includes a label switch path identifier that matches RLSPID. From block 613, the process continues to block 619 where the events correlated at block 613 are stored in either memory 129 or database 135.

If at diamond 610, RLSPID does not match an LSPID entry in the PRIMARYLSPLIST, the process continues to diamond 622. At diamond 622 the LSPEVENTSHISTORY list is checked to determine if an event X1 is listed or stored such that X1EVENTTYPE is equal to LSP UP (LPU) and X1NEWROUTE shares a link with ROLDROUTE. If X1EVENTTYPE is equal to LSP UP and X1NEWROUTE shares a link with ROLDROUTE, then event R is correlated to event X1. That is, X1EVENTTYPE is determined to have caused event R. This corresponds to case S3 of FIG. 2 and is denoted by block 625. From block 625, the process continues to block 619 where the events correlated at block 625 are stored in either memory 129 or database 135.

If at diamond 622 ROLDROUTE does not share a link with a label switch path that experienced an LSP UP event, the process continues to diamond 628. At diamond 628 the LSPEVENTSHISTORY list is checked to determine if an event X2 is stored such that X2EVENTTYPE is equal to LSP REROUTE (LPR) and X2NEWROUTE shares a link with ROLDROUTE. If both these conditions are met (i.e., X2EVENTTYPE is equal to LSP REROUTE and X2NEWROUTE shares a link with ROLDROUTE), then event R is correlated with event X2 at block 631 as a S5 event (see FIG. 2). From block 631, the process continues to block 619 where the events correlated at block 631 are stored in either memory 129 or database 135.

If at diamond 631 ROLDROUTE does not share a link with a previously rerouted LSP, event R is stored as an uncorrelated LSP event at block 634. From block 634 the process continues to block 637, where after a predetermined delay the event R is reconsidered at diamond 607. In addition to including a predetermined timer, block 634 is preferably implemented such that after a predetermined number of passes through the flowchart 600, the event is maintained in memory 129 or database 135 as part of either the PRIMARYLSPLIST, LINKUPHISTORY or LSPEVENTSHISTORY lists, as is appropriate.

If at diamond 607 (either initially or on reconsideration from block 637) REVENTTYPE is set to LSP UP, processing continues to diamond 640. If at diamond 640 RLSPID matches an LSPID in the PRIMARYLSPLIST and the LSPID is associated with a LINK UP event, e.g., event E1, then event R is correlated with event E1. Under these conditions, case P2 in FIG. 2 applies as is indicated in block 642. From block 642, the process continues to block 619 where the events correlated at block 642 are stored in either memory 129 or database 135. In the case of multiple entry records, the latest record is maintained.

If at diamond 640 the conditions necessary to proceed to block 642 are not met, the process continues to diamond 645. If at diamond 645 there exists a link event L1 in the LINKUPHISTORY list such that the LINK ID of L1 is included RNEWROUTE, then the event R is correlated with the event L1 as a P2 event (see FIG. 2) as is indicated at block 647. In this case, the cleared LSP may have changed route to a path facilitated by a recent link clearance. If multiple link events exist, then the latest link event is correlated with the event R. From block 647, the process continues to block 619.

If at diamond 645 the conditions necessary to proceed to block 647 are not met, the process continues to diamond 650. If at diamond 650 there exists an LSPEVENT X5 in the LSPEVENTSHISTORY list such that X5EVENTTYPE is equal to LSP DOWN and X5OLDROUTE shares a link with RNEWROUTE, then event R is correlated with LSPEVENT X5 at block 655. From block 655, the process continues to block 619.

If at diamond 650 the conditions necessary to proceed to block 655 are not met, the process continues to diamond 658. If at diamond 658 there is exists an LSPEVENT X6 in the LSPEVENTSHISTORY list such that X6EVENTTYPE is equal to LSP REROUTE and X6OLDROUTE shares a link with RNEWROUTE and X6NEWROUTE does not share the same link with RNEWROUTE, the R is correlated with LSPEVENT X6 as is shown at block 661. Block 661 depicts case S6 in FIG. 2.

If at diamond 658 the conditions necessary to proceed to block 661 are not met, then event R is stored as an uncorrelated event at block 634. From block 634 processing continues to block 637. At block 637 after a predetermined delay the event R is reconsidered at diamond 607.

If at diamond 607, REVENTTYPE is set to RLSPREROUTE, the process continues to diamond 664. At diamond 664, a determination is made of whether the RLSPREROUTE occurred because of a LINK DOWN event. In particular, if at diamond 664 RLSPID matches an LSPID in the PRIMARYLSPLIST list and the LSPID is associated with a LINK DOWN event, e.g., event E3, then event R is correlated with event E3. If multiple entries exist, then event R is associated with the latest entry. The correlation of R with E3 is shown at block 666 and is represented by P3 in FIG. 2. From block 666, processing continues to block 619.

If at diamond 664 the conditions necessary to proceed to block 666 are not met, processing continues to diamond 668. If at diamond 668 an event L2 exists in LINKUPHISTORY list such that the LINK ID of L2 is included RNEWROUTE, then the event R is correlated with the event L2 as a P4 event (see FIG. 2) as is indicated at block 670. From block 670, processing continues to block 619.

If at diamond 668 the conditions necessary to proceed to block 670 are not met, processing continues to block 672. If at diamond 672 there exists an LSPEVENT X9 in the LSPEVENTSHISTORY list such that X9EVENTTYPE is equal to LSP UP and X9NEWROUTE shares a link with ROLDROUTE, then event R is correlated with LSPEVENT X9 at block 674. From block 674 processing continues to block 619.

Alternatively, from diamond 672 processing may continue to diamond 676. If at diamond 676 there exists an LSPEVENT X10 in the LSPEVENTSHISTORY list such that X10EVENTTYPE is equal to RLSPREROUTE and X10NEWROUTE shares a link with RNEWROUTE, then event R is correlated with LSPEVENT X10 at block 678. From block 678 processing proceeds to block 619.

If at diamond 676 the conditions necessary to proceed to block 678 are not met, processing continues to diamond 680. If at diamond 680 there exists an LSPEVENT X11 in the LSPEVENTSHISTORY list such that X11EVENTTYPE is equal to RLSPREROUTE and X11NEWROUTE shares a link with ROLDROUTE and X11OLDROUTE does not share the same link with RNEWROUTE, then event R is correlated with LSPEVENT X11 at block 682. From block 682 processing continues to block 619.

If at diamond 680 the conditions necessary to proceed to block 682 are not met, then event R is stored as an uncorrelated event at block 634. From block 634 processing continues to block 637. At block 637 after a predetermined delay the event R may then be reconsidered at diamond 607. As previously discussed, if at block 637 the same event is processed after a predetermined number of retries, the event R may be stored in the appropriate list, such as the PRIMARYLSPLIST, LINKUPHISTORY or LSPEVENTSHISTORY lists.

Returning to diamond 604, if the event R was determined to be a link event, e.g., LINK UP, LINK DOWN, etc., the LINKID associated with the event R would be used to populate the PRIMARYLSPLIST list with the appropriate information as illustrated at block 688. In particular, for each link event, a unique EVENTID is generated and the attributes EVENTID, LINKID, and LSPID are initialized with appropriate values. As such, a record of each LSP that traverses a link that generates a link event is created and maintained.

Thus, in accordance with an aspect of the present invention, the correlation matrix 220 of FIG. 2 establishes a set of correlation rules that are used by the correlation analysis engine 123 to correlate events that may be related to each other in an MPLS type network. Generally, in accordance with this aspect of the present invention, a correlation matrix may be generated for any network where resources are shared based on priorities such that dependencies between resources changes dynamically based on network events. Other networks employing such schemes include, for example, Wavelength Division Multiplexed (WDM) networks use a shared mesh protection scheme.

The results of the correlation analysis as set forth, for example, in FIG. 6 is stored in block 619. The results of the correlation analysis may be passed on to the correlation graph manager 126 and preferably represented in the form of a correlation graph. The correlation engine 104 (via the correlation analysis engine 123 and graph manager 126) may then update the correlation graph after the completion of an analysis triggered by the reception of an event or trap, such as event R of FIG. 6. The correlation graph is preferably in the form of a directed acyclic graph in accordance with a further aspect of the present invention. At any given time, for any given link or LSP, there is at most one node that is associated with the link or LSP. Thus, when a node is added to the correlation graph, a node that is associated with a previous event associated with the same link or LSP that exists on the graph is removed from the graph. Since the correlation graph is preferably intended to represent a deviation of the current network state from a reference state, the correlation engine removes subgraphs from the correlation graph if the subgraph is not associated with LKD and LPD events, does not include an outgoing edge or incoming edge and all the LSPs associated with LSP events in the subgraph are currently routed through their primary paths.

Figure 7:
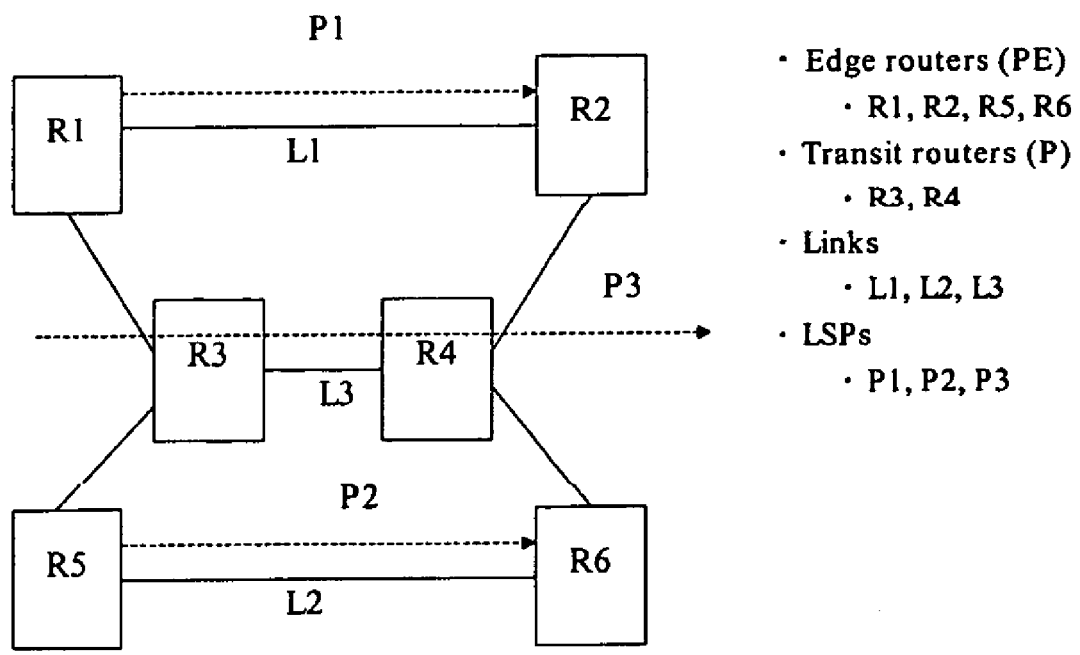
FIG. 7 depicts an exemplary multiprotocol label switching network in accordance with an aspect of the present invention.

Turning now to FIG. 7, there is illustrated a sample MPLS network 700 having six Label Switching Routers (LSRs), labeled as R1 through R6. R1, R2, R5 and R6 are edge LSRs. R3 and R4 are transit routers. Three LSPs, P1, P2 and P3 are configured as follows: P1 includes a primary path denoted as {R1, R2} and a backup path {R1, R3, R4, R2}; P2 includes a primary path {R5, R6} and a backup path {R5, R3, R4, R6}; P3 includes a primary path that traverses R3 and R4 (the origin and destination points for path P3 are not shown in FIG. 7) and does not include a backup path. The network is assigned the following priority: Priority of P1 (denoted Priority[P1])>Priority[P2]>Priority[P3]. As shown, the backup paths of P1 and P2 share a common link L3. L3 includes enough bandwidth to support either P3 and P2 at the same time or P1. Such a backup protection is generally referred to as a shared mesh protection configuration.

In accordance with the foregoing example, if links L1 and L2 fail, a correlation engine in accordance with an aspect of the present invention would receive the following sequence of events:

L2 failed; P2 rerouted; L1 failed; P2 failed; P1 rerouted; P3 failed

Figure 8:
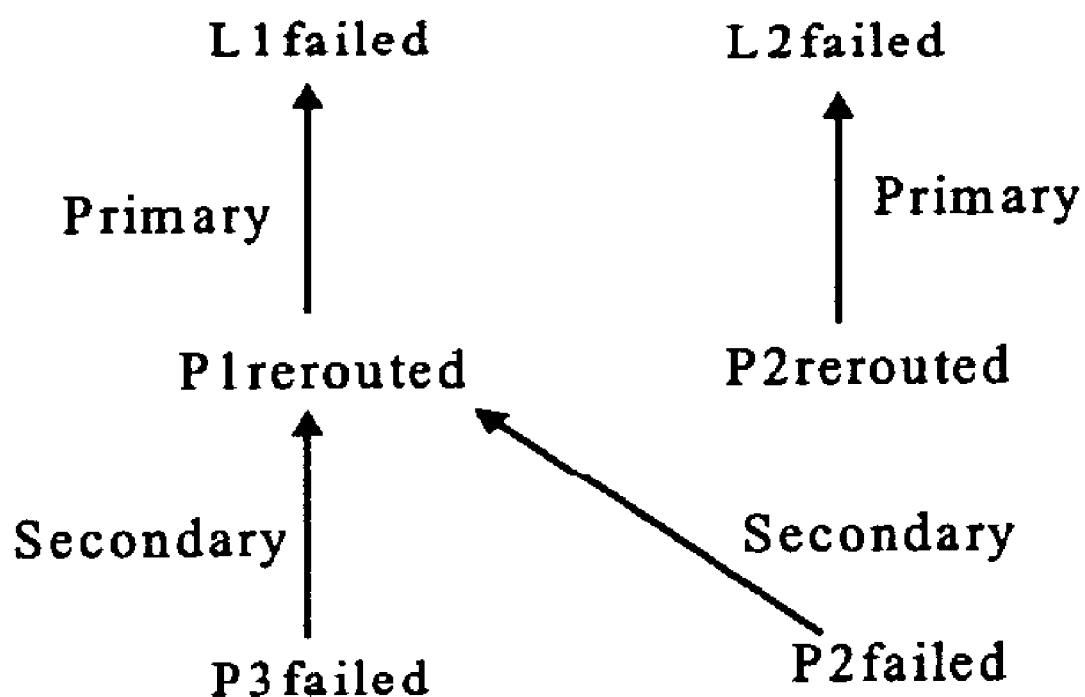
FIG. 8 depicts an exemplary correlation graph in accordance with an additional aspect of the present invention.

The correlation engine 104 performs route-based correlation and produces a directed acyclic correlation graph 800 as shown in FIG. 8. As FIG. 8 shows the graph indicates that the node P1REROUTED is a primary impacted event that was caused by the event L1FAILED because an edge is directed from P1REROUTED to L1FAILED. The node P3FAILED is a secondary event caused by P1 being rerouted, P1REROUTED. In addition, P2 was rerouted because L2FAILED (P2REROUTED includes an directed to L2FAILED) and is a primary impacted event. However, P2 failed is a secondary event caused by P1 being rerouted, P2FAILED includes an outgoing edge to P1REROUTED.

In addition, the correlation graph can be used to determine the effects of a repair if revertive restoration is enabled in a network, such as an MPLS network. In particular, if revertive restoration is enabled, the network attempts to revert LSPs to their primary path (or more generally to a path that is of higher priority than the current active path). In Cisco routers, revertive restoration can be activated by enabling the LSP reoptimization parameter. Assuming revertive restoration is enable, in accordance with the graph shown in FIG. 8 the following events will result if links L1 and L2 are repaired. If L1 is repaired, P1 reverts and P2 and P3 become operational. On the other hand, if L2 is repaired P2 reverts, but P3 remains in a failed state.

In accordance with this aspect of the present invention, a network management system that includes correlation engine 104 would direct network resources to fixing the L1 failure as that would result in restoral of paths P1, P2 and P3.

Figure 9:
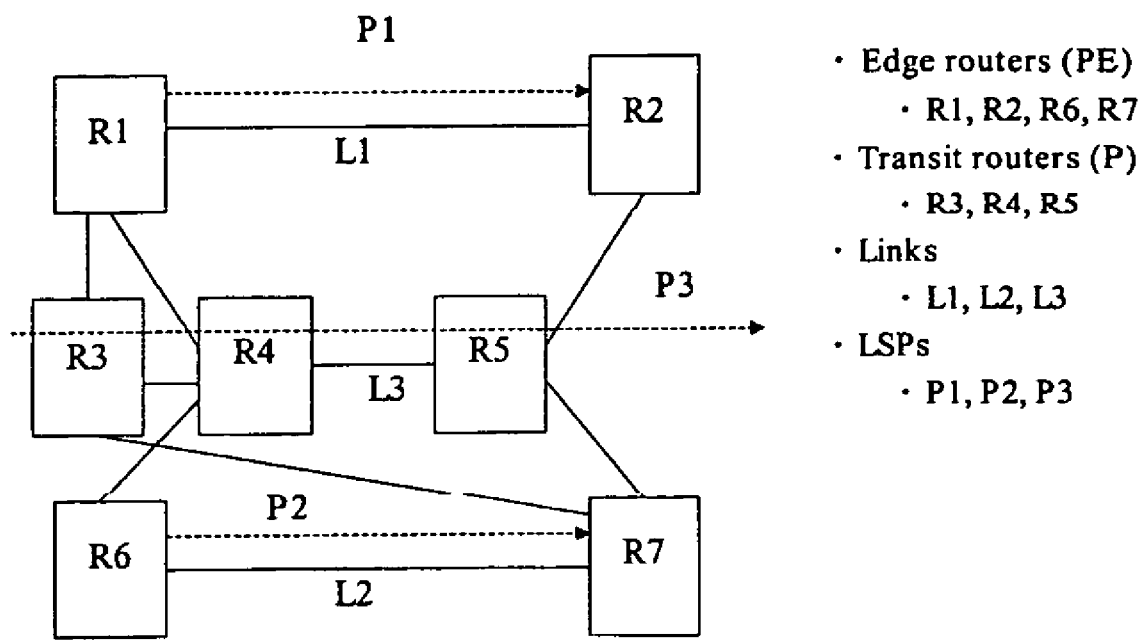
FIG. 9 depicts an exemplary multiprotocol label switching network in accordance with an aspect of the present invention.

FIG. 9 illustrates another exemplary network configuration 900 in accordance with a further aspect of the present invention. In the network configuration 900, seven LSRs, labeled R1 through R7, are shown. R1, R2, R6 and R7 are edge LSRs. R3, R4 and R5 are transit routers. Three LSPs, P1, P2 and P3, are configured as follows:

P1: primary path is {R1, R2}; first and second backup paths are {R1, R4, R5, R2} and {R1, R3, R7, R5, R2}.

P2: primary path is {R6, R7}; backup path is {R6, R4, R5, R7}.

P3: primary path traverses R3, R4 and R5 (origin and destination are not shown in FIG. 9); no back-up path.

Priority(P1)>Priority(P2)>Priority (P3)

As described above the backup paths of P1 and P2 share a common link, L3. L3 has bandwidth sufficient to support either {P3 and P2} or {P3 and P1} or {P1 and P2}, but not {P1, P2 and P3}. If both links L1 and L2 fail the following sequence of events would be received as traps by the network engine 104: L2 failed; P2 rerouted; L1 failed; P1 rerouted; P3 failed. The results of a correlation analysis in accordance with an aspect of the present invention is as is shown in FIG. 10.

Figure 10:
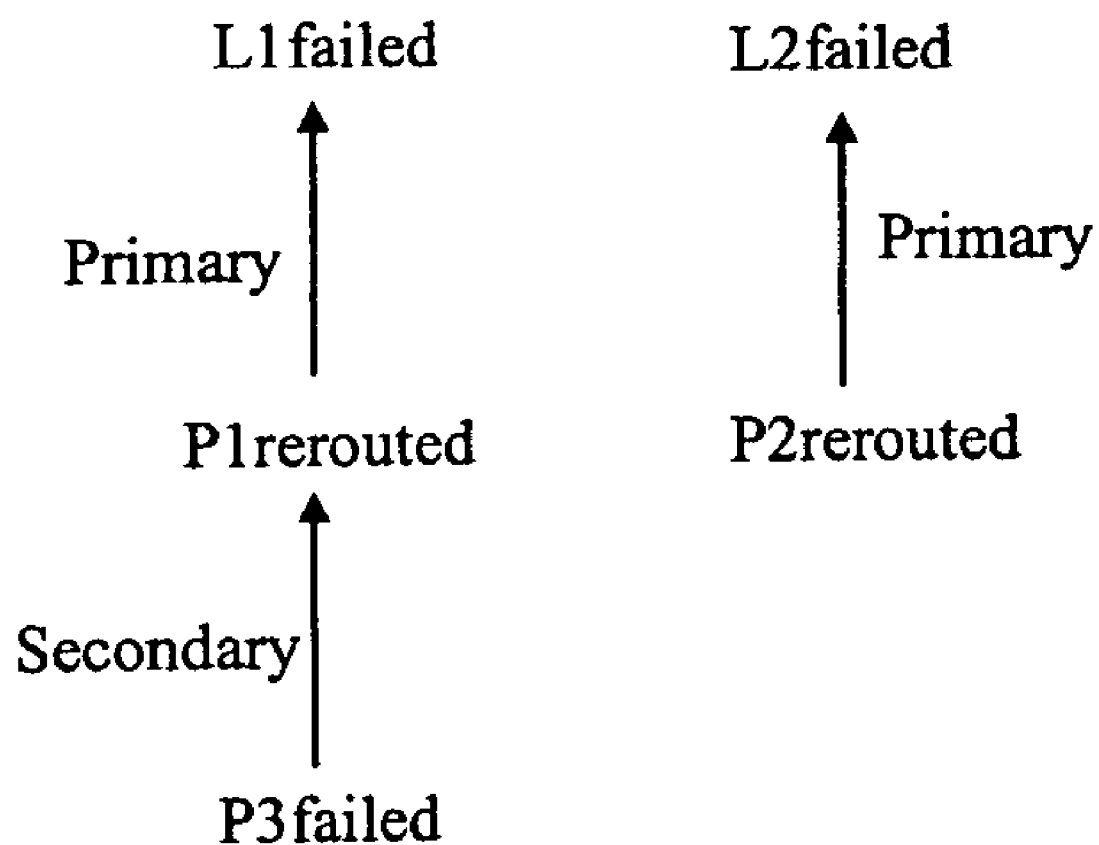
FIG. 10 depicts an exemplary correlation graph in accordance with an additional aspect of the present invention.

Based on FIG. 10, a management system implemented in accordance with an aspect of the present invention would indicate that P3 can be restored if the dependency between P3 and P1 is broken by rerouting P1, which is currently routed on the first backup path {R1, R4, R5, R2} to the second backup path {R1, R3, R7, R5, R2}. This can be accomplished by reordering the backup path list of P1. This would cause the network to reroute P1 to the path {R1, R3, R7, R5, R2}, which in turn allows P3 to become operational. Such directed rerouting is needed, for example, when it is not possible to avoid all route intersections of LSPs by traffic engineering.

Figure 11:
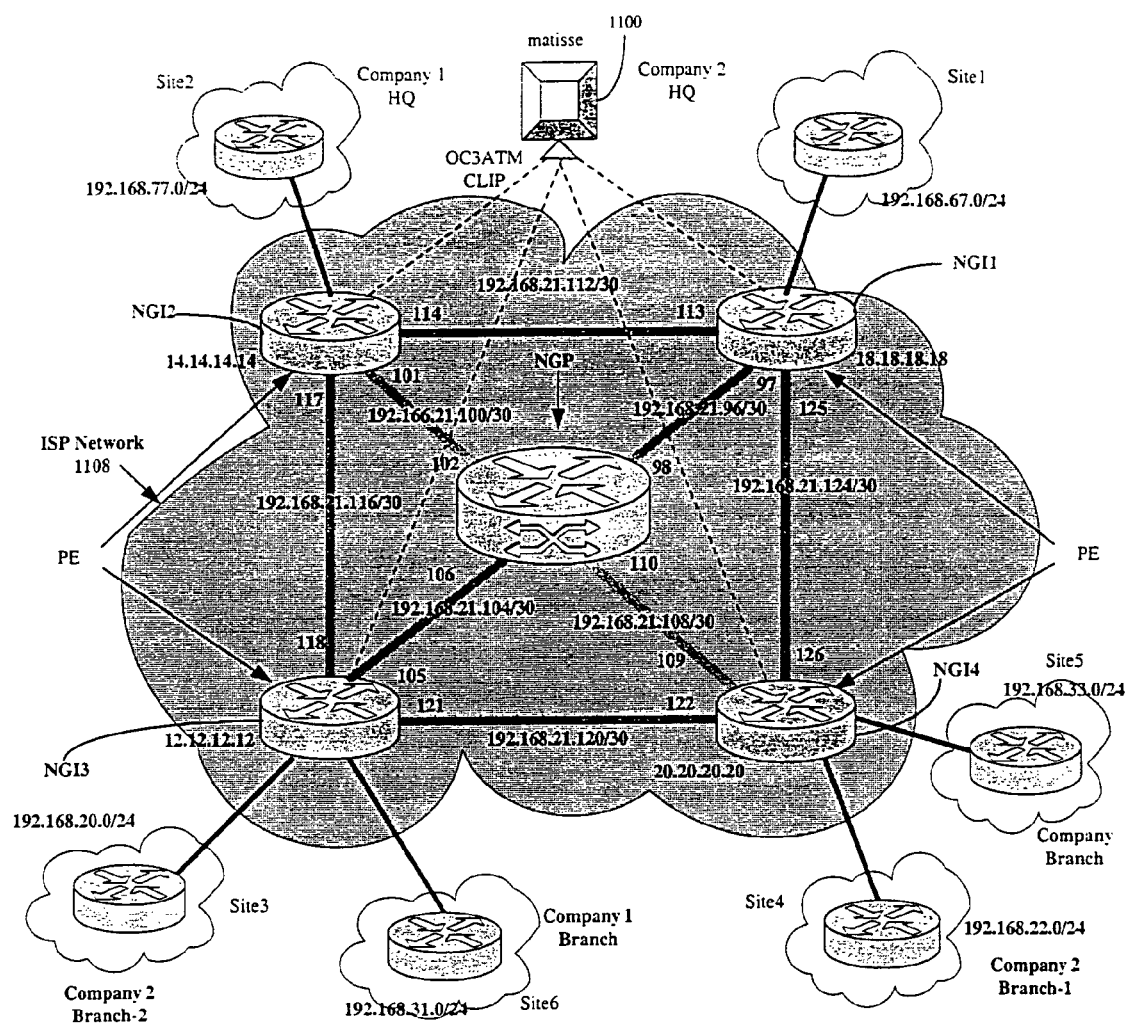
FIG. 11 depicts a network topology diagram along with a system in accordance with additional aspects of the present invention.

Turning now to FIG. 11, there is depicted a network topology diagram along with a system in accordance with additional aspects of the present invention. In particular, a system 1100 is shown coupled to a multiprotocol label switching (MPLS) network. The MPLS network includes an Internet Service Provider (ISP) network 1108 that includes a plurality of routers, labeled as NGI1, NGI2, NGI3 and NGI4, and core router NGP. The routers NGI1, NGI2, NGI3 and NGI4 are edge labeled switched routers (denoted as PE). The ISP network 1108 provides LSPs for routers located at company sites labeled as Site1 through Site6. Each company site may be coupled to ISP network 1108 by a fast Ethernet connection. As FIG. 11 also shows each router is assigned a unique IP address and each port on a router within ISP network 1108 is assigned a unique port identifier. For example, port 125 on NGI1 is coupled to port 126 on NGI4 over a link having an IP address of 192.168.21.124/30. The routers within ISP network 1108 are coupled together using OC-3 (156 Mb/s Synchronous Optical Network) and ATM links.

Figure 12:
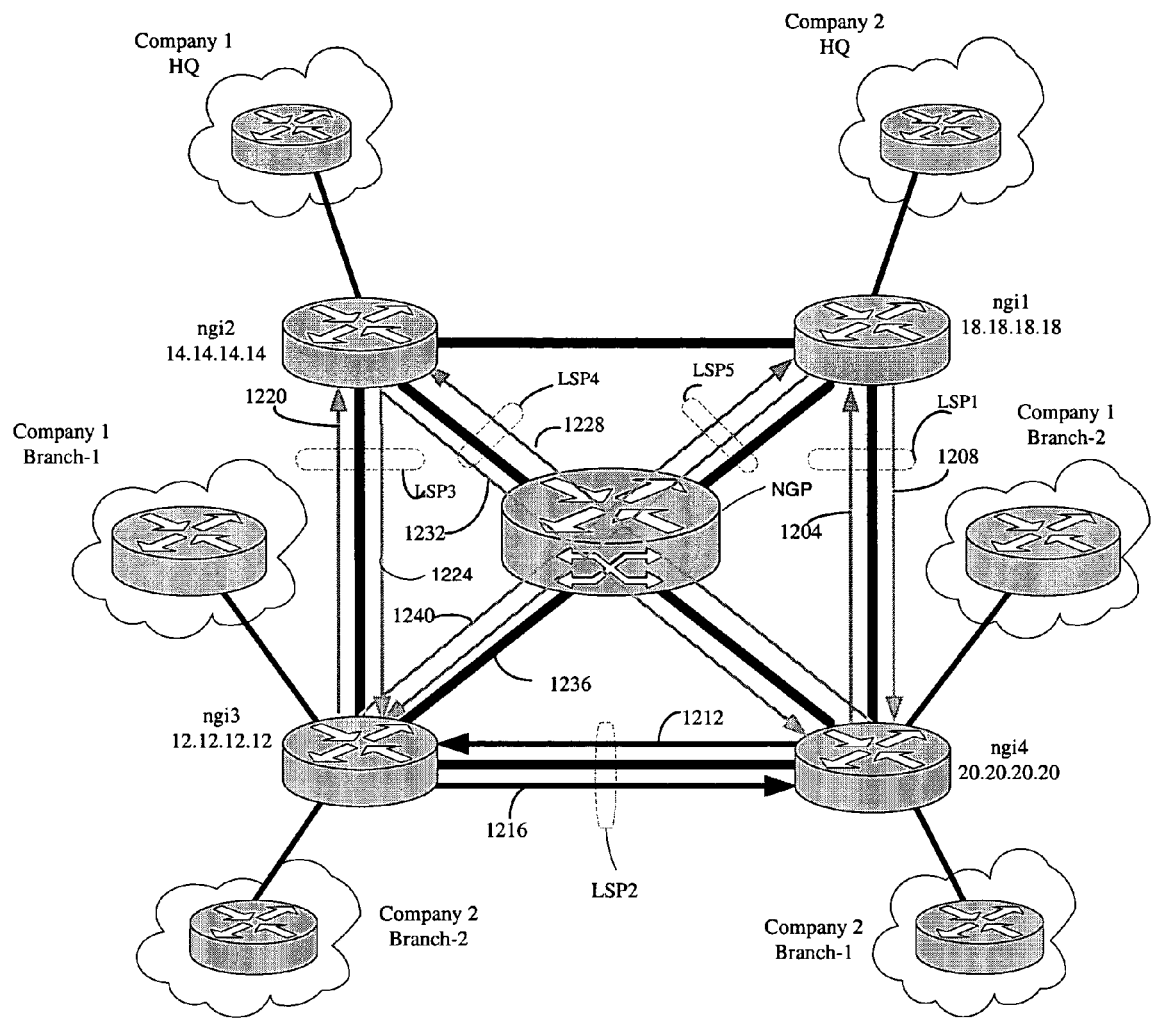
FIG. 12 illustrates the route of the LSPs of the network shown in FIG. 11 when the network is in a reference state.

FIG. 12 illustrates the route of the LSPs of the network shown in FIG. 11 when the network is in a reference state. In particular, pairs of LSPs, LSP1 and LSP1' (arrows 1204 and 1208), are established between NGI1 and NGI4, LSP2 and LSP2' (arrows 1212 and 1216) are established between NGI3 and NGI4, LSP3 and LSP3' (arrows 1220 and 1224) are established between NGI3 and NGI2, LSP4 and LSP4' (arrows 1228 and 1232) are established between NGI2 and NGI4 and LSP5 and LSP5' (arrows 1236 and 1240) are established between NGI1 and NGI3.

Figure 13:
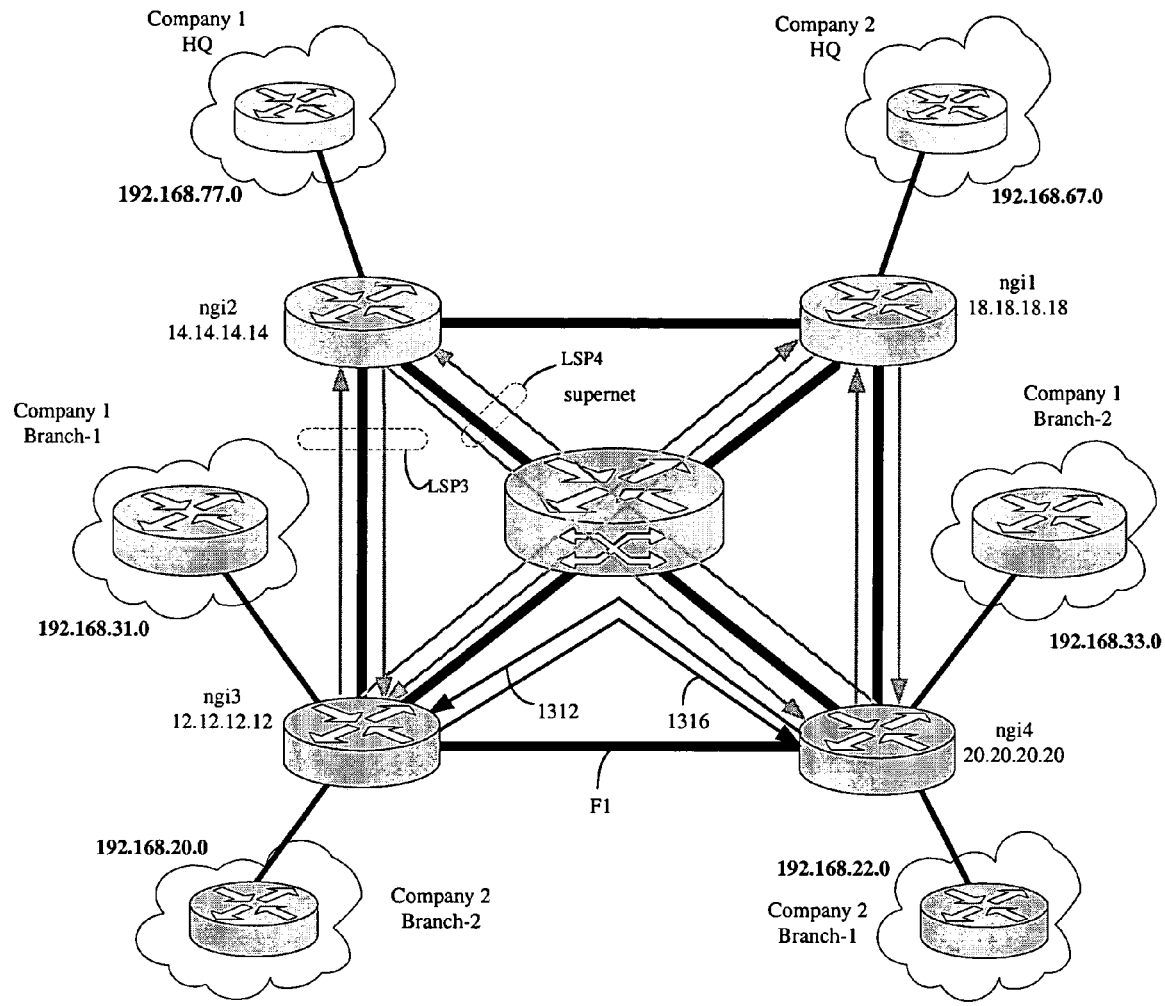
FIG. 13 illustrates the network of FIG. 11 in a failed condition.

In FIG. 13, a failure (F1) is shown as occurring on LSP2 and LSP2', which results in traffic between NGI3 and NGI4 being routed along a path defined by NGI4-NGP-NGI3 (arrows 1312 and 1316). The following three events messages or traps are received in response to failure F1:

| 1 | LPR | ngi3/t3 192.168.21.106,192.168.21.109,20.20.20.20 |
| 2 | LPR | ngi4/t3 192.168.21.110,192.168.21.105,12.12.12.12 |
| 3 | LKD | 192.168.21.121 |

LPR events 1 and 2 indicate reroute of LSP2 and LSP2' and event 3 is a link down (LKD) event that caused the reroutes. The LPR events provide the current route of LSP2 and LSP2' in its fourth field. A correlation may be obtained by applying rule P3 (see FIGS. 2 and 6).

Figure 14:
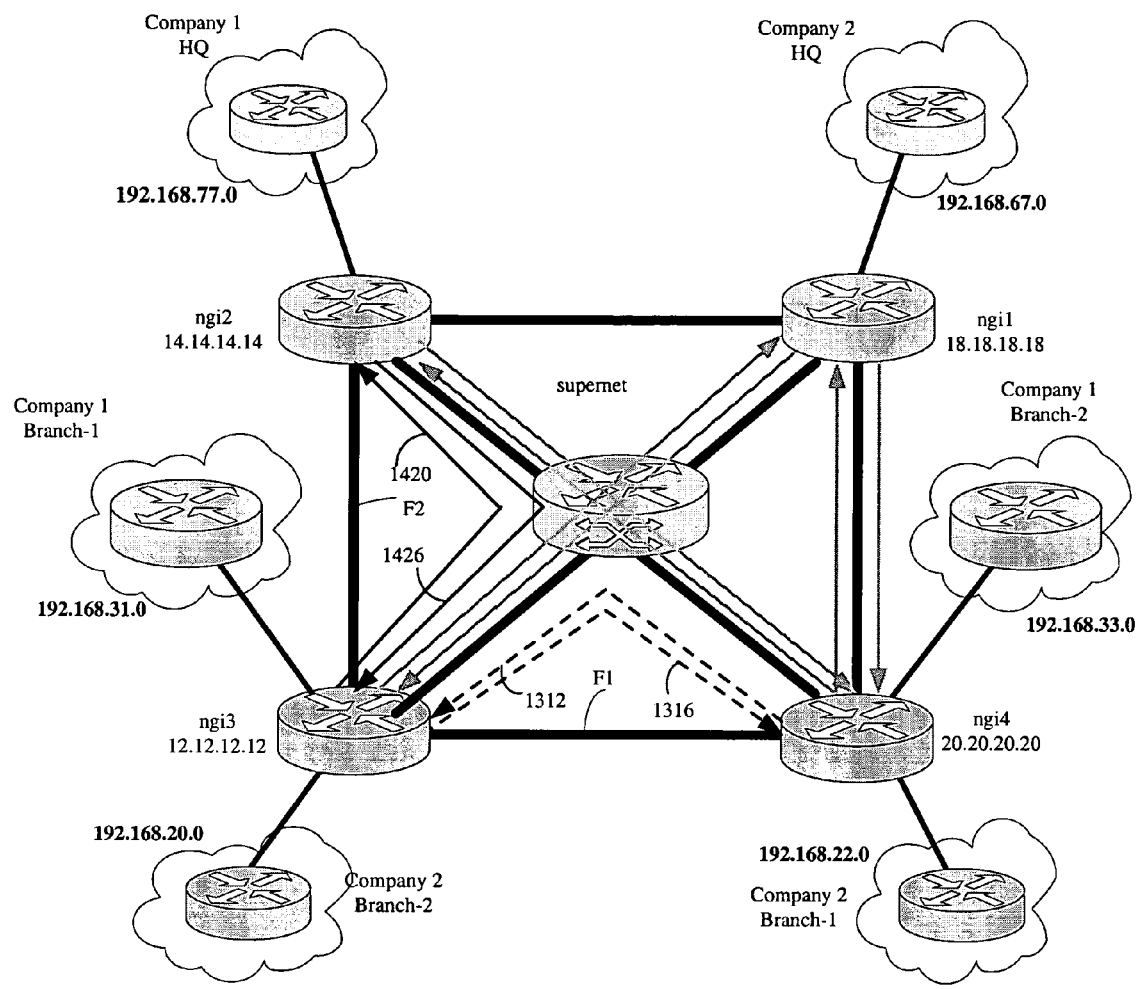
FIG. 14 illustrates the network of FIG. 11 in a failed condition.

FIG. 14 illustrates the state of the network after failure F2 and the receipt of the following five additional traps:

| 4 | LPR | ngi3/t1 192.168.21.106,192.168.21.101,14.14.14.14 |
| 5 | LPR | ngi2/t2 192.168.21.102,192.168.21.105,12.12.12.12 |
| 6 | LKD | 192.168.21.118 |
| 7 | LPD | ngi3/t3 |
| 8 | LPD | ngi4/t3 |

Events 4 and 5 indicate that LSP3 was reroute because of event 6, which is a link down event. The rule P3 is again applied to obtain correlation. Events 7 and 8 occur because the new routes for LSP3 and LSP3' (see arrows 1420 and 1426) preempt the rerouting of LSP2 and LSP2' (arrows 1312 and 1316). A correlation of event 7 with event 4 and event 8 with event 5 may be obtained using rule S2 (see FIGS. 2 and 6).

Figure 15:
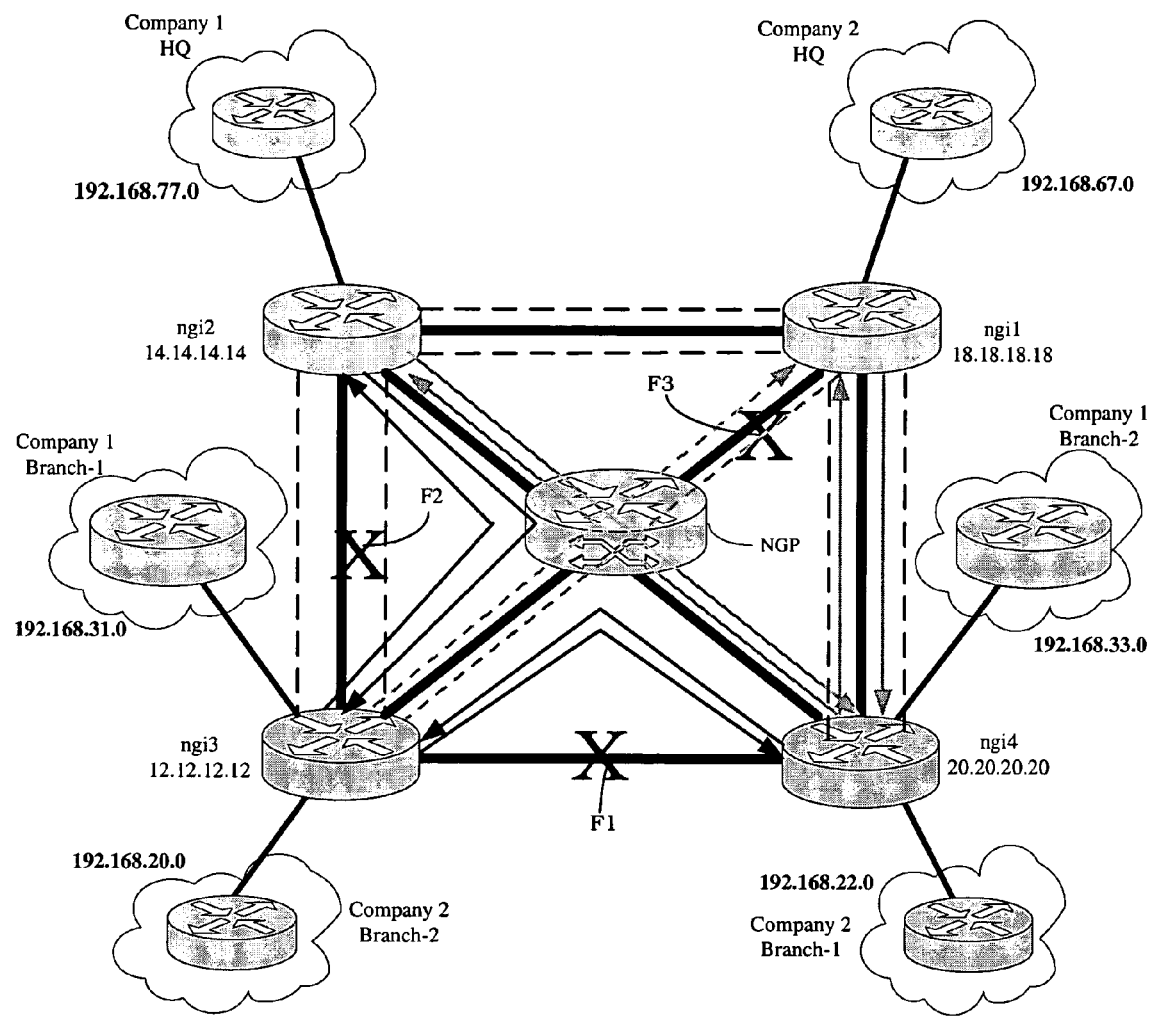
FIG. 15 illustrates the network of FIG. 11 in a failed condition.

FIG. 15 illustrates the state of the network after receipt of the following five additional messages:

| 9 | LKD | 192.168.21.97 |
| 10 | LPD | ngi3/t2 |
| 11 | LPD | ngi1/t2 |
| 12 | LPU | ngi3/t3 192.168.21.106,192.168.21.109,20.20.20.20 |
| 13 | LPU | ngi4/t3 192.168.21.110,192.168.21.105,12.12.12.12 |

Event 9 is a link down event. Events 10 and 11 are LSP down events for LSPs 1 and 5. Events 10 and 11 may be correlated to Event 9 using rule P1 of FIG. 2. Event 12 and event 13 indicate clearance of LSP2 and LSP2', which can now use the bandwidth relinquished by LSPs 5 and 5'. Event 12 is correlated with event 10 and event 13 is correlated with event 11 using rule S3 (see FIGS. 2 and 6).

A correlation prototype software in accordance with a further aspect of the present invention used the following inputs:
1. Network topology data in an XML file named ndb.xml
2. Network events data in form of a text file named events.dat A network topology file ndb.xml for the illustrative networks of FIGS. 11 through 15 is listed below. It contains information about the routers, interfaces, links and LSPs in a MPLS network.

```
<MplsNetwork>
    <Routers>
        <Router name = "ngi1" loopback = "18.18.18.18">
            <interface name = "ATM1" ip = "192.168.21.125" />
            <interface name = "ATM2" ip = "192.168.21.113"/>
            <interface name = "POS1" ip = "192.168.21.97"/>
        </Router>
        <Router name = "ngi2" loopback = "14.14.14.14">
            <interface name = "ATM1" ip = "192.168.21.114"/>
            <interface name = "ATM2" ip = "192.168.21.117"/>
            <interface name = "POS1" ip = "192.168.21.101"/>
        </Router>
        <Router name = "ngi3" loopback = "12.12.12.12">
            <interface name = "ATM1" ip = "192.168.21.118"/>
            <interface name = "ATM2" ip = "192.168.21.121"/>
            <interface name = "POS1" ip = "192.168.21.105"/>
        </Router>
        <Router name = "ngi4" loopback = "20.20.20.20">
            <interface name = "ATM1" ip = "192.168.21.122"/>
            <interface name = "ATM2" ip = "192.168.21.126"/>
            <interface name = "POS1" ip = "192.168.21.109"/>
        </Router>
        <Router name = "supernet" loopback = "16.16.16.16">
            <interface name = "POS1" ip = "192.168.21.102"/>
            <interface name = "POS2" ip = "192.168.21.106"/>
            <interface name = "POS3" ip = "192.168.21.110"/>
            <interface name = "POS4" ip = "192.168.21.98"/>
        </Router>
    </Routers>
    <Links>
        <Link name = "A112" interfaceA = "192.168.21.113" interfaceZ = "192.168.21.114"/>
        <Link name = "A116" interfaceA = "192.168.21.117" interfaceZ = "192.168.21.118"/>
        <Link name = "A120" interfaceA = "192.168.21.121" interfaceZ = "192.168.21.122"/>
        <Link name = "A124" interfaceA = "192.168.21.125" interfaceZ = "192.168.21.126"/>
        <Link name = "POS96" interfaceA = "192.168.21.97" interfaceZ = "192.168.21.98"/>
        <Link name = "POS100" interfaceA = "192.168.21.101" interfaceZ = "192.168.21.102"/>
        <Link name = "POS104" interfaceA = "192.168.21.105" interfaceZ = "192.168.21.106"/>
        <Link name = "POS108" interfaceA = "192.168.21.109" interfaceZ = "192.168.21.110"/>
```

-continued

```
        </Links>
        <LSPs>
            <LSP name = "ngi1/t1" source = "18.18.18.18" dest = "20.20.20.20"
                priority = "0"
                hops = "192.168.21.126,20.20.20.20" />
            <LSP name = "ngi1/t2" source = "18.18.18.18" dest = "12.12.12.12"
                priority = "0"
                hops = "192.168.21.98,192.168.21.105,12.12.12.12" />
            <LSP name = "ngi2/t1" source = "14.14.14.14" dest = "20.20.20.20"
                priority = "1"
                hops = "192.168.21.102,192.168.21.109,20.20.20.20" />
            <LSP name = "ngi2/t2" source = "14.14.14.14" dest = "12.12.12.12"
                priority = "1"
                hops = "192.168.21.118,12.12.12.12" />
            <LSP name = "ngi3/t1" source = "12.12.12.12" dest = "14.14.14.14"
                priority = "1"
                hops = "192.168.21.117,14.14.14.14" />
            <LSP name = "ngi3/t2" source = "12.12.12.12" dest = "18.18.18.18"
                priority = "0"
                hops = "192.168.21.106,192.168.21.97,18.18.18.18" />
            <LSP name = "ngi3/t3" source = "12.12.12.12" dest = "20.20.20.20"
                priority = "2"
                hops = "192.168.21.122,20.20.20.20" />
            <LSP name = "ngi4/t1" source = "20.20.20.20" dest = "18.18.18.18"
                priority = "0"
                hops = "192.168.21.125,18.18.18.18" />
            <LSP name = "ngi4/t2" source = "20.20.20.20" dest = "14.14.14.14"
                priority = "1"
                hops = "192.168.21.110,192.168.21.102,14.14.14.14" />
            <LSP name = "ngi4/t3" source = "20.20.20.20" dest = "12.12.12.12"
                priority = "2"
                hops = "192.168.21.121,12.12.12.12" />
        </LSPs>
    </MplsNetwork>
```

The events file named events.dat for the illustrative network and exemplary correlation operation of FIGS. 11-15 is as indicated below.

```
    1    LPR   ngi3/t3   192.168.21.106,192.168.21.109,20.20.20.20
    2    LPR   ngi4/t3   192.168.21.110,192.168.21.105,12.12.12.12
    3    LKD   192.168.21.121
    4    LPR   ngi3/t1   192.168.21.106,192.168.21.101,14.14.14.14
    5    LPR   ngi2/t2   192.168.21.102,192.168.21.105,12.12.12.12
    6    LKD   192.168.21.118
    7    LPD   ngi3/t3
    8    LPD   ngi4/t3
    9    LKD   192.168.21.97
show status
    10   LPD   ngi3/t2
    11   LPD   ngi1/t2
    12   LPU   ngi3/t3   192.168.21.106,192.168.21.109,20.20.20.20
    13   LPU   ngi4/t3   192.168.21.110,192.168.21.105,12.12.12.12
show status
```

Each line in the events file represents an event. The first field denotes an event ID. The second field denotes the type of event. The third field denotes the name of network resource. In the case of an LSP event the LSP name is the network resource while in case of a link event the network resonance is the IP address of the interface that reported the link failure. In case of LSP reroute and up events (LPR and LPU) the fourth field represents the current route of the LSP. The current route is expressed as a sequence of IP hops that the LSP propagates through. Events file may also contain "show status" commands, which prompt the software to show the status of correlation engine and the correlation graph at that point of time.

A sample output of the correlation prototype software is shown below. The output shows a log of events along with their correlation data. The second part of the output is a correlation graph, which is a cumulative result of analysis.

The graph provides a list of events that indicate deviations in the current network state from the initial state. In this list, link down events are listed as root causes and LSP events are shown correlated to link events and/or other LSP events. The status of correlation engine and correlation graph has been outputted twice in the listing below.

```
Loading network database from ndb.xml
Network Database loaded successfully.
Reading network events from events.dat
LPR-ngi3/t3 - (192.168.21.106,192.168.21.109,20.20.20.20)
LPR-ngi4/t3 - (192.168.21.110,192.168.21.105,12.12.12.12)
LKD-192.168.21.121
Recorded as root cause.
cause of LPR-ngi4/t3 - (192.168.21.110,192.168.21.105,12.12.12.12)
cause of LPR-ngi3/t3 - (192.168.21.106,192.168.21.109,20.20.20.20)
LPR-ngi3/t1 - (192.168.21.106,192.168.21.101,14.14.14.14)
LPR-ngi2/t2 - (192.168.21.102,192.168.21.105,12.12.12.12)
LKD-192.168.21.118
Recorded as root cause.
cause of LPR-ngi2/t2 - (192.168.21.102,192.168.21.105,12.12.12.12)
cause of LPR-ngi3/t1 - (192.168.21.106,192.168.21.101,14.14.14.14)
LPD-ngi3/t3
Secondary correlation to
    LPR-ngi3/t1 - (192.168.21.106,192.168.21.101,14.14.14.14)
LPD-ngi4/t3
Secondary correlation to
    LPR-ngi2/t2 - (192.168.21.102,192.168.21.105,12.12.12.12)
LKD-192.168.21.97
Recorded as root cause.
Monitor Status
Primary LSP list
ngi3/t2 ---> LKD-192.168.21.97
ngi1/t2 ---> LKD-192.168.21.97
Link up history
Correlation graph
Root Cause Events
LKD-192.168.21.121
LKD-192.168.21.118
LKD-192.168.21.97
Other Events
LPR-ngi2/t2 - (192.168.21.102,192.168.21.105,12.12.12.12) because of
    LKD-192.168.21.118
LPR-ngi3/t1 - (192.168.21.106,192.168.21.101,14.14.14.14) because of
    LKD-192.168.21.118
LPD-ngi4/t3 - ( ) because of
    LKD-192.168.21.121
    LPR-ngi2/t2 - (192.168.21.102,192.168.21.105,12.12.12.12)
LPD-ngi3/t3 - ( ) because of
    LKD-192.168.21.121
    LPR-ngi3/t1 - (192.168.21.106,192.168.21.101,14.14.14.14)
LPD-ngi3/t2
correlated to LKD-192.168.21.97
LPD-ngi1/t2
correlated to LKD-192.168.21.97
LPU-ngi3/t3 - (192.168.21.106,192.168.21.109,20.20.20.20)
probably correlated to LPD-ngi3/t2
LPU-ngi4/t3 - (192.168.21.110,192.168.21.105,12.12.12.12)
probably correlated to LPD-ngi1/t2
Monitor Status
Primary LSP list
Link up history
Correlation graph
Root Cause Events
LKD-192.168.21.121
LKD-192.168.21.118
LKD-192.168.21.97
Other Events
LPD-ngi1/t2 because of
    LKD-192.168.21.97
LPD-ngi3/t2 because of
    LKD-192.168.21.97
LPR-ngi2/t2 - (192.168.21.102,192.168.21.105,12.12.12.12) because of
    LKD-192.168.21.118
LPR-ngi3/t1 - (192.168.21.106,192.168.21.101,14.14.14.14) because of
    LKD-192.168.21.118
LPU-ngi4/t3 - (192.168.21.110,192.168.21.105,12.12.12.12) because of
    LKD-192.168.21.121
```

-continued

LPU-ngi3/t3 - (192.168.21.106,192.168.21.109,20.20.20.20) because of LKD-192.168.21.121

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

We claim:

1. A method for determining a root cause of event messages on a network, the method comprising:
receiving a first plurality of event message from the network, the first event message being associated with a service path through the network and representative of a change in status in the network;
analyzing parameters of the first event message to determine if a first event associated with the first event message correlates to a second event;
examining a field of the first event message to determine if the field is set to one of label switch path (LSP) down, LSP reroute, and LSP up;
if the first event associated with the first event message correlates to the second event, assigning an impact level to the correlation between the first event and the second event, wherein the impact level assigned is one of a plurality of primary impact levels or one of a plurality of secondary impact levels; and
if the first event associated with the first event message does not correlate to the second event, storing the first event message as an uncorrelated event.

2. The method of claim 1, wherein the process of analyzing includes determining whether the first event message was caused by a status change on a service path.

3. The method of claim 1, wherein the process of analyzing step of correlating includes determining whether the service path associated with the first event message shares a link with a second service path associated with the second event.

4. The method of claim 1, further comprising determining if the first event associated with the first event message is a link event.

5. The method of claim 1, wherein the network is a generalized multiprotocol label switching optical network.

6. The method of claim 1, wherein the process of analyzing parameters of the first event message to determine if the first event associated with the first event message correlates to the second event comprises determining if a field of the first event message matches an entry in a list associated with the second event.

7. The method of claim 1, wherein each of the plurality of primary impact levels is associated with a LSP down event type, a LSP reroute event type, or a LSP up event type.

8. The method of claim 1, wherein each of the plurality of secondary impact levels is associated with a LSP down event type, a LSP reroute event type, or a LSP up event type.

9. The method of claim 1, further comprising representing the first event in the form of a directed acyclic graph including indicating whether the first event is caused by a change of status of a service path.

10. The method of claim 1, wherein the analyzing is based at least in part on a correlation matrix, and wherein the correlation matrix comprises a data structure that identifies impacts on the service path that are caused by a plurality of predetermined events.

11. The method of claim 1, wherein the primary impact level indicates that an event is a direct consequence of a network resource state change.

12. The method of claim 1, wherein the secondary impact indicates that an event is an indirect consequence of a network status change.

13. A method for monitoring a status of a network, the method comprising:
receiving a plurality of event traps from the network, wherein at least two event traps of the plurality of event traps are consequences of a network status change;
tracking information relating to the current route of service paths through the network, wherein at least one of said service paths is affected by said network status change;
analyzing parameters of the at least two event traps of the plurality of event traps to determine if a first event trap of the at least two event traps is caused by a second event trap of the at least two event traps;
examining a field of the first event trap message to determine if the field is set to one of label switch path (LSP) down, LSP reroute, and LSP up;
if the first event trap of the at least two event traps is caused by the second event trap of the at least two event traps, assigning an impact level, wherein the impact level assigned is one of a plurality of primary impact levels or one of a plurality of secondary impact levels; and
if the first event trap of the at least two event traps is not caused by the second event trap of the at least two event traps, storing the first event trap as an uncorrelated event.

14. The method of claim 13, further comprising representing the traps in the form of a directed acyclic graph including indicating whether the first event trap is caused by a change of status of said at least one of said service paths.

15. The method of claim 13, wherein the tracked route information includes an association between a label switched path traversing the network and a link in the path.

16. The method of claim 13, wherein the process of analyzing includes associating an event trap with a path if the path traverses the link on which the network link failure event was detected.

17. A system for monitoring a status of a network, the system comprising:
an interface;
a computing device; and
a computer-readable medium including instructions which, when executed, cause the computing device to perform the following operations:
associating routes of paths traversing the network with links between devices in the network;
receiving, via the interface, a plurality of network event traps from the network, wherein at least two of said network event traps are consequences of a change in the status of the paths or links on the network;
analyzing parameters of the at least two event traps of the plurality of network event traps to determine if a first network event trap is caused by a second network event trap;
examining a field of the first event trap to determine if the field is set to one of label switch path (LSP) down, LSP reroute, and LSP up;
if the first network event trap is caused by the second network event trap, assigning an impact level, wherein the impact level assigned is one of a plurality of primary impact levels or one of a plurality of secondary impact levels; and if the first network event trap is not caused by the second event trap, storing the first network event trap as an uncorrelated event.

18. The system of claim 17, wherein the network is a multiprotocol label switching network.

19. The system of claim 17, wherein the route information includes one or more label switched paths in a multiprotocol label switching network.

20. The system of claim 19, wherein the multiprotocol label switching network is an internet protocol network.

21. The system of claim 19, wherein the multiprotocol label switching network is a generalized multiprotocol label switching optical network.

22. The system of claim 17, wherein the network event traps are in the form of Simple Network Management Protocol traps.

23. A tangible computer-readable medium having instructions stored thereon, the instructions comprising:

instructions for receiving a first of event message from the network, the first event message being associated with a service path through the network and representative of a change in status in the network;

instructions for analyzing parameters of the first event message to determine if a first event associated with the first event message correlates to a second event;

instructions for examining a field of the first event message to determine if the field is set to one of label switch path (LSP) down, LSP reroute, and LSP up;

instructions for, if the first event associated with the first event message correlates to the second event, assigning an impact level to the correlation between the first event and the second event, wherein the impact level assigned is one of a plurality of primary impact levels or one of a plurality of secondary impact levels; and instructions for, if the first event associated with the first event message does not correlate to the second event, storing the first event message as an uncorrelated event.

24. The tangible computer-readable medium of claim 23, wherein the instructions for analyzing include instructions for determining whether the first event message was caused by a status change on a service path.

25. The tangible computer-readable medium of claim 23, wherein the instructions for analyzing include instructions for determining whether the service path associated with the first event message shares a link with a second service path associated with the second event.

26. The tangible computer-readable medium of claim 23, further comprising instructions for determining if the first event associated with the first event massage is a link event.

27. The tangible computer-readable medium of claim 26, wherein the network is a generalized multiprotocol label switching optical network.

28. The tangible computer-readable medium of claim 23, wherein the instructions for analyzing parameters of the first event message to determine if the first event associated with the first event message correlates to the second event include instructions for determining if a field of the first event message matches an entry in a list associated with the second event.

29. The tangible computer-readable medium of claim 23, wherein each of the plurality of primary impact levels is associated with a LSP down event type, a LSP reroute event type, or a LSP up event type.

30. The tangible computer-readable medium of claim 23, wherein each of the plurality of secondary impact levels is associated with a LSP down event type, a LSP reroute event type, or a LSP up event type.

31. The tangible computer-readable medium of claim 23, further comprising instructions for representing the first event in the form of a directed acyclic graph including indicating whether the first event is caused by a change of status of a service path.

* * * * *

UNITED STATES PATENT AND TRADEMARK OFFICE
CERTIFICATE OF CORRECTION

| | | |
|---|---|---|
| PATENT NO. | : 7,965,620 B2 | Page 1 of 1 |
| APPLICATION NO. | : 10/853083 | |
| DATED | : June 21, 2011 | |
| INVENTOR(S) | : Gadgil et al. | |

It is certified that error appears in the above-identified patent and that said Letters Patent is hereby corrected as shown below:

Column 17, line 19, in Claim 1, delete "plurality of event" and insert -- event --.

Column 17, line 42, in Claim 3, delete "step of correlating" and insert -- process of analyzing --.

Column 18, line 23, in Claim 13, delete "trap message" and insert -- trap --.

Column 19, line 23, in Claim 23, delete "first of" and insert -- first --.

Column 20, line 14, in Claim 26, delete "massage" and insert -- message --.

Signed and Sealed this
Eleventh Day of October, 2011

David J. Kappos
*Director of the United States Patent and Trademark Office*